US012703766B2

(12) United States Patent
Ha et al.

(10) Patent No.: US 12,703,766 B2
(45) Date of Patent: Aug. 11, 2026

(54) MATTING POLYMER COMPOSITION HAVING EXCELLENT WEATHER RESISTANCE AND IMPACT RESISTANCE, AND MATTE SHEET INCLUDING THE SAME

(71) Applicant: HANNANOTECH CO., LTD., Daejeon (KR)

(72) Inventors: Doo Han Ha, Yeosu-si (KR); Soo Wan Kim, Daejeon (KR); Sung Wook Ha, Yeosu-si (KR)

(73) Assignee: HANNANOTECH CO., LTD., Daejeon (KR)

( * ) Notice: Subject to any disclaimer, the term of this patent is extended or adjusted under 35 U.S.C. 154(b) by 837 days.

(21) Appl. No.: 17/823,900

(22) Filed: Aug. 31, 2022

(65) Prior Publication Data

US 2023/0081156 A1 Mar. 16, 2023

(30) Foreign Application Priority Data

Sep. 3, 2021 (KR) ........................ 10-2021-0117851

(51) Int. Cl.

| | |
|---|---|
| ***C08F 265/04*** | (2006.01) |
| ***B29C 48/00*** | (2019.01) |
| ***B29C 48/40*** | (2019.01) |
| ***C08F 12/08*** | (2006.01) |
| ***C08F 220/44*** | (2006.01) |
| ***C08J 5/18*** | (2006.01) |
| ***C08K 5/1515*** | (2006.01) |
| ***C08K 5/3415*** | (2006.01) |
| ***C08K 5/42*** | (2006.01) |

(52) U.S. Cl.

CPC .......... *C08F 265/04* (2013.01); *B29C 48/022* (2019.02); *B29C 48/40* (2019.02); *C08F 12/08* (2013.01); *C08F 220/44* (2013.01); *C08J 5/18* (2013.01); *C08K 5/1515* (2013.01); *C08K 5/3415* (2013.01); *C08K 5/42* (2013.01)

(58) Field of Classification Search

CPC ........... C08L 25/12; C08L 25/16; C08L 51/04

See application file for complete search history.

(56) References Cited

U.S. PATENT DOCUMENTS

| | | | |
|---|---|---|---|
| 5,530,062 | A | 6/1996 | Bradtke et al. |
| 2019/0185655 | A1 | 6/2019 | Park et al. |

FOREIGN PATENT DOCUMENTS

| | | | | |
|---|---|---|---|---|
| CN | 106574096 A | 4/2017 | | |
| KR | 980002149 A | 3/1998 | | |
| KR | 20040054301 A | 6/2004 | | |
| KR | 100853432 B1 | 8/2008 | | |
| KR | 101150016 B1 | 6/2012 | | |
| KR | 101236655 B1 | 2/2013 | | |
| KR | 101816428 B1 * | 1/2018 | ............... | C08K 3/34 |
| KR | 20180023492 A | 3/2018 | | |

OTHER PUBLICATIONS

KR101816428B1 Machine translation (Year: 2025).*

Korean Intellectual Property Office, Office Action Issued in Application No. 10-2021-0117851, Nov. 5, 2021, 10 pages.

State Intellectual Property Office of the People's Republic of China, Office Action and Search Report Issued in Application No. 202211060780.X, Jun. 25, 2025, 13 pages. (Submitted with Partial Translation).

* cited by examiner

*Primary Examiner* — Jeffrey S Lenihan

(74) *Attorney, Agent, or Firm* — McCoy Russell LLP

(57) ABSTRACT

Provided are a matting polymer composition having excellent weather resistance and impact resistance, and a matte sheet including the same. The matting polymer composition according to the present disclosure includes two kinds of styrene-acrylonitrile copolymers having different acrylonitrile contents, and a matting agent, and thus, a molded article manufactured by an extrusion or injection process has mechanical properties such as excellent weather resistance and impact resistance, and also may show an effective matting effect and excellent appearance quality.

14 Claims, No Drawings

MATTING POLYMER COMPOSITION HAVING EXCELLENT WEATHER RESISTANCE AND IMPACT RESISTANCE, AND MATTE SHEET INCLUDING THE SAME

CROSS-REFERENCE TO RELATED APPLICATION

This application claims priority to Korean Patent Application No. 10-2021-0117851, filed on Sep. 3, 2021. The entire contents of the above-listed application are hereby incorporated by reference for all purposes.

TECHNICAL FIELD

The following disclosure relates to a matting polymer composition having excellent weather resistance and impact resistance, and a matte sheet including the same.

BACKGROUND

In general, various thermoplastic resins such as polyvinyl chloride (PVC) polycarbonate (PC), polymethylmethacrylate (PMMA), and acrylonitrile-butadiene-styrene copolymer (ABS) are used in building materials. Recently, as the consumers' level of sensibility and taste rises, a demand for a matte resin increases for imparting luxury texture to a material.

In order to produce the matte surface as such, a method of physically processing a resin surface to decrease gloss has been used, but there are an economical problem and a problem of deteriorating matting performance by wear during processing. As another method, a matting resin is laminated using a thermoplastic resin having excellent mechanical and chemical properties, such as PVC and ABS, as a base layer. For example, an ABS resin as a base layer is co-extruded with a matting resin including PMMA and a matting agent to manufacture a multilayer sheet, but the mechanical strength of the sheet is greatly deteriorated by adding the matting agent, weather resistance was insufficient, and a satisfactory matte surface is not secured.

In addition, mechanical properties such as weather resistance and thermal resistance should be satisfied for use as building exterior materials for construction, and PVC which is commonly used as a base layer of the multilayer sheet has excellent chemical resistance, but has insufficient weather resistance and colorability, and ABS has excellent moldability and impact resistance, but has poor weather resistance, and thus, it is important to improve weather resistance which is a prerequisite for building exterior materials and also secure a matte surface.

Therefore, research and development of a matting polymer composition which has excellent weather resistance, mechanical properties, and chemical properties, and may secure a matte surface and a high-quality surface appearance are desperately demanded.

SUMMARY

An embodiment of the present disclosure is directed to providing a matting polymer composition including a matting agent having an excellent matting effect.

Another embodiment of the present disclosure is directed to providing a matting polymer composition which has excellent mechanical properties such as weather resistance and impact strength and also allows a matte surface and a high-quality surface appearance, by extruding or injecting an acrylate-styrene-acrylonitrile graft copolymer and two kinds of styrene-acrylonitrile copolymers having different acrylonitrile contents from each other with a matting agent, and a molded article thereof.

Still another embodiment of the present disclosure is directed to providing a matte multilayer sheet which is laminated on a base layer by co-extruding the matting polymer composition described above.

The present inventors found that when an acrylate-styrene-acrylonitrile graft copolymer and two kinds of styrene-acrylonitrile copolymers having different acrylonitrile contents from each other are extruded or injected with a specific matting agent, a molded article having excellent mechanical properties such as weather resistance and impact strength and also having an excellent matting effect and a high-quality surface appearance may be manufactured, thereby completing the present disclosure.

In one general aspect, a matting polymer composition includes: (A) an acrylate-styrene-acrylonitrile graft copolymer; (B-1) a first styrene-acrylonitrile copolymer; (B-2) a second styrene-acrylonitrile copolymer; and (C) a matting agent, wherein the first styrene-acrylonitrile copolymer and the second styrene-acrylonitrile copolymer have different acrylonitrile contents from each other.

According to an exemplary embodiment of the present disclosure, the first styrene-acrylonitrile copolymer may have an acrylonitrile content of 31 to 40 wt %, and the second styrene-acrylonitrile copolymer may have an acrylonitrile content of 22 to 30 wt %.

According to an exemplary embodiment of the present disclosure, the matting agent may be prepared from a composition for reaction extrusion including polystyrene (PS), a styrene-acrylonitrile copolymer (SAN), a N-phenylmaleimide-based copolymer (PMI), an alicyclic epoxy compound, and an acid compound.

According to an exemplary embodiment of the present disclosure, the matting agent may be prepared from a composition for reaction extrusion including polycarbonate (PC), a styrene-acrylonitrile copolymer (SAN), an alicyclic epoxy compound, and an acid compound.

The alicyclic epoxy compound may be one or more selected from the group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis(3,4-epoxy-6-methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, 1,2,8,9-diepoxylimonene, and the like.

According to an exemplary embodiment of the present disclosure, the acid compound may be any one or a combination of two or more selected from the group consisting of $R_1COOH$ or $R_2SO_3H$, and salt compounds thereof, wherein $R^1$ and $R^2$ are independently $C_{6-30}$ alkyl, $C_{6-30}$ aryl, or $C_{6-30}$ ar$C_{6-30}$ alkyl.

According to an exemplary embodiment of the present disclosure, the composition for reaction extrusion may include 10 to 20 wt % of the polystyrene, 60 to 80 wt % of the styrene-acrylonitrile copolymer, 5 to 20 wt % of the N-phenylmaleimide-based copolymer, 1 to 6 wt % of the alicyclic epoxy compound, and 0.01 to 1.5 wt % of the acid compound.

According to an exemplary embodiment of the present disclosure, the composition for reaction extrusion may include 15 to 35 wt % of the polycarbonate, 60 to 80 wt % of the styrene-acrylonitrile copolymer, 1 to 6 wt % of the alicyclic epoxy compound, and 0.01 to 1.65 wt % of the acid compound.

According to an exemplary embodiment of the present disclosure, the matting polymer composition may include 50 to 90 parts by weight of the first styrene-acrylonitrile copolymer, 15 to 35 parts by weight of the second styrene-acrylonitrile copolymer, and 2 to 24 parts by weight of the matting agent, based on 100 parts by weight of the acrylate-styrene-acrylonitrile graft copolymer.

According to an exemplary embodiment of the present disclosure, a weight ratio between the first styrene-acrylonitrile copolymer and the second styrene-acrylonitrile copolymer may be 1:0.1 to 0.5.

According to an exemplary embodiment of the present disclosure, the second styrene-acrylonitrile copolymer may have a glass transition temperature of 110 to 130° C.

According to an exemplary embodiment of the present disclosure, the matting polymer composition may include 5 to 50 parts by weight of the first styrene-acrylonitrile copolymer, 30 to 100 parts by weight of the second styrene-acrylonitrile copolymer, and 2 to 24 parts by weight of the matting agent, based on 100 parts by weight of the acrylate-styrene-acrylonitrile graft copolymer.

According to an exemplary embodiment of the present disclosure, the matting polymer composition may further include a third styrene-acrylonitrile copolymer having a weight average molecular weight of 4,000,000 g/mol or more.

According to an exemplary embodiment of the present disclosure, 1 to 6 parts by weight of the third styrene-acrylonitrile copolymer may be included based on 100 parts by weight of the acrylate-styrene-acrylonitrile graft copolymer.

In another general aspect, a molded article manufactured by extruding or injecting the matting polymer composition is provided.

In another general aspect, a sheet includes: a base layer, and a skin layer laminated by co-extruding the matting polymer composition described above on the base layer.

According to an exemplary embodiment of the present disclosure, the base layer may be one or more selected from the group consisting of polyvinyl chloride (PVC), polypropylene (PP), polyacrylate, polyethylene terephthalate (PET), polybutylene terephthalate (PBT), polymethylmethacrylate (PMMA), polycarbonate (PC), polyamide, styrene-acrylonitrile copolymer (SAN) acrylonitrile-butadiene-styrene (AB S), acrylonitrile-styrene-acrylate (ASA), and mixtures thereof.

Other features and aspects will be apparent from the following detailed description, the drawings, and the claims.

DETAILED DESCRIPTION

Hereinafter, the present disclosure will be described in more detail with reference to specific examples and exemplary embodiments including the accompanying drawings. However, the following specific examples or exemplary embodiments are only a reference for describing the present disclosure in detail, and the present disclosure is not limited thereto, and may be implemented in various forms.

In addition, unless otherwise defined, all technical terms and scientific terms have the same meanings as those commonly understood by one of those skilled in the art to which the present disclosure pertains. The terms used herein are only for effectively describing a certain specific example, and are not intended to limit the present disclosure.

In addition, the singular form used in the specification and claims appended thereto may be intended to also include a plural form, unless otherwise indicated in the context.

In addition, unless explicitly described to the contrary, a part "comprising" a constituent element will be understood to imply further inclusion of other constituent elements rather than the exclusion of any other constituent elements.

The term "matting" property in the present specification refers to the property of lowering gloss by a difference in a shrinkage and a refractive index between polymers and between the polymer and an additive in an incompatible polymer composition, or a diffuse reflection effect through surfaced processing.

The present disclosure will be understood better by the following exemplary embodiments, and the following exemplary embodiment is intended to be illustrative of the present disclosure and not to limit the protection scope, defined by the attached claims.

Hereinafter, an exemplary embodiment of the present disclosure will be described in more detail.

The present disclosure provides a matting polymer composition including: (A) an acrylate-styrene-acrylonitrile graft copolymer; (B-1) a first styrene-acrylonitrile copolymer; (B-2) a second styrene-acrylonitrile copolymer; and (C) a matting agent, wherein the first styrene-acrylonitrile copolymer and the second styrene-acrylonitrile copolymer have different acrylonitrile contents from each other.

As the acrylate-styrene-acrylonitrile graft copolymer, an acrylate-styrene-acrylonitrile copolymer (hereinafter, referred to as ASA) in which acrylate, styrene, and acrylonitrile are polymerized by a common or known method may be used, which may be a graft copolymer polymerized by an emulsion polymerization method and an emulsion polymerization method, and a commercially available product may be used without limitation. In some embodiments, ASA having an acrylate content of 35 wt % or more or 40 to 80 wt % in the copolymer may be used, and when the range is satisfied, mechanical properties such as impact strength may be improved. In addition, the content of ASA may be 10 to 90 wt %, or 40 to 70 wt % based on the total weight of the matting polymer composition, but is not limited thereto. In the present disclosure, in order to easily secure weather resistance which is essential physical properties of an exterior material, ASA is used instead of ABS, and by mixing two or more kinds of styrene-acrylonitrile copolymers having different acrylonitrile contents from each other with the ASA, a matting polymer composition having more improved weather resistance and impact strength may be prepared.

The first styrene-acrylonitrile copolymer (hereinafter, referred to as SAN-1) may be a copolymer in which styrene and acrylonitrile are polymerized by a common or known method, and the SAN-1 may have an acrylonitrile content ($AN\%_{SAN-1}$) of 31 to 40 wt % or 31 to 35 wt %, and a weight average molecular weight of 50,000 to 150,000 g/mol, or 90,000 to 120,000 g/mol. When the SAN-1 satisfies the acrylonitrile content range described above and the weight average molecular weight, commercially available SAN products may be used without limitation.

The second styrene-acrylonitrile copolymer (hereinafter, referred to as SAN-2) may be a copolymer in which styrene and acrylonitrile are polymerized by a common or known method, and the SAN-2 may have an acrylonitrile content (AN $\%_{SAN-2}$) of 22 to 30 wt % or 24 to 29 wt %, a weight average molecular weight of 70,000 to 250,000 g/mol, or 80,000 to 195,000 g/mol, or 100,000 to 170,000 g/mol, and a glass transition temperature of 80 to 150° C., or 90 to 130° C. When the SAN-2 satisfies the acrylonitrile content range described above and the weight average molecular weight, commercially available SAN products may be used without limitation.

A difference between the acrylonitrile content (AN $\%_{SAN-1}$) included in the SAN-1 and the acrylonitrile content (AN $\%_{SAN-2}$) included in the SAN-2 may be 2 to 18 wt %, 2 to 15 wt %, 3 to 12 wt %, or 4 to 10 wt %. When the range is satisfied, compatibility with the ASA base polymer is excellent, and thus, mechanical properties such as impact strength may be improved and a uniform matte surface may be effectively produced in extrusion processing.

According to an exemplary embodiment of the present disclosure, the matting polymer composition may include 20 to 110 parts by weight of the SAN-1 and 5 to 80 parts by weight of the SAN-2, or 50 to 90 parts by weight of the SAN-1 and 15 to 35 parts by weight of the SAN-2, or 60 to 80 parts by weight of the SAN-1 and 10 to 30 parts by weight of the SAN-2, based on 100 parts by weight of the ASA. When the content range is satisfied, the acrylonitrile content in the composition may be appropriately adjusted to effectively suppress yellowing of a molded article, and the molded article may have excellent weather resistance and impact strength by further improved compatibility with ASA. In addition, the matting polymer composition may be extruded/injected to manufacture a product which is exposed to the external environment, such as building exterior materials.

In addition, a weight ratio between SAN-1 and SAN-2 may be 1:0.05 to 1, or 0.1 to 0.5, or 0.2 to 0.3. When the weight ratio range is satisfied, the dispersibility of the composition is excellent, so that mechanical properties such as impact strength may be further improved, and the total content of acrylonitrile included in the composition may be appropriately adjusted to further improve weather resistance and surface appearance quality.

According to another embodiment of the present disclosure, the second styrene-acrylonitrile copolymer may be α-styrene-acrylonitrile copolymer (hereinafter, referred to as α-SAN-2), and α-methylstyrene may be included at 50 to 80 mol %, or 65 to 75 mol % based on the total number of moles of the structural unit forming the copolymer. The α-SAN-2 may have a glass transition temperature of 100 to 150° C., or 100 to 140° C., or 110 to 130° C., and a weight average molecular weight of 50,000 to 150,000 g/mol or 70,000 to 130,000 g/mol. In addition, the matting polymer composition may include 1 to 80 parts by weight of SAN-1 and 10 to 150 parts by weight of α-SAN-2, or 5 to 50 parts by weight of SAN-1 and 30 to 100 parts by weight of α-SAN-2, or 10 to 30 parts by weight of SAN-1 and 50 to 90 parts by weight of α-SAN-2, based on 100 parts by weight of the copolymer, but is not limited thereto as long as the physical properties to be desired in the present disclosure are not impaired. Since α-SAN-2 includes α-methylstyrene, the matting polymer composition including the α-SAN-2 may have better thermal resistance, and may have excellent processability in extrusion processing to have a surface appearance having improved quality. In addition, when the range is satisfied, thermal stability such as thermal resistance may be further improved, and thus, applications to various uses requiring thermal properties are allowed.

According to an exemplary embodiment of the present disclosure, the matting polymer composition may further include a third styrene-acrylonitrile copolymer (hereinafter, referred to as SAN-3) having a weight average molecular weight of 4,000,000 g/mol or more, or 5,000,000 g/mol or more, and unlimitedly, 10,000,000 g/mol or less. The SAN-3 may be prepared by an emulsion polymerization method from a polymerizable composition including 20 to 30 wt % of acrylonitrile and 70 to 80 wt % of styrene, but is not limited thereto.

When the SAN-3 resin satisfying the molecular weight range is added to the matting polymer composition, roughness is imparted finely and uniformly to a surface in extrusion processing, thereby further improving matting performance, and also, there is no deterioration of mechanical properties such as impact resistance, and weather resistance and thermal resistance may be effectively improved. In addition, the SAN-3 may be included at 0.1 to 6 parts by weight, or 1 to 5 parts by weight based on 100 parts by weight of ASA.

The matting agent may be a commercially available styrene-based matting agent, but may be a matting agent prepared from a composition for reaction extrusion including polystyrene (PS), a styrene-acrylonitrile copolymer (SAN), a N-phenylmaleimide-based copolymer (PMI), an alicyclic epoxy compound, and an acid compound. When the matting agent prepared from the composition for reaction extrusion is mixed with ASA, SAN-1, and SAN-2 and used, surface gloss may be significantly decreased without deterioration of mechanical properties, and in particular, a molded article having a surface appearance of better quality in extrusion processing may be manufactured.

Polystyrene (PS) included in the composition for reaction extrusion may be commercially available general-purpose polystyrene, and may have a weight average molecular weight of 80,000 to 300,000 g/mol and a glass transition temperature of 95 to 110° C., and any polystyrene satisfying the ranges may be used without limitation. In addition, a commercially available product may be used.

The styrene-acrylonitrile copolymer (SAN) included in the composition for reaction extrusion may have a weight average molecular weight of 50,000 to 300,000 g/mol, a glass transition temperature of 95 to 130° C. or 95 to 120° C., and an acrylonitrile content of 5 to 50 wt % or 15 to 40 wt %, but is not limited thereto, and any styrene-acrylonitrile copolymer satisfying the ranges may be used without limitation. In addition, a commercially available product may be used.

N-phenylmaleimide-based copolymer (PMI) included in the composition for reaction extrusion may be prepared by copolymerizing 10 to 60 wt % of a N-substituted maleimide monomer and 40 to 90 wt % of a vinyl-based monomer, or 10 to 40 wt % of a N-substituted maleimide monomer and 60 to 90 wt % of a vinyl-based monomer, and the N-substituted maleimide monomer may be one or more selected from the group consisting of N-phenylmaleimide, maleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, N-benzylmaleimide, and the like.

In addition, the vinyl-based monomer may be an aromatic vinyl-based monomer, and specifically, may be one or more selected from the group consisting of styrene, α-methylstyrene vinyl toluene, t-butyl styrene, halogen-substituted styrene, 1,3-dimethyl styrene, 2,4-dimethyl styrene, ethyl styrene, and the like.

The N-phenylmaleimide-based copolymer may be copolymerized by a commonly used or known method, and the N-phenylmaleimide-based copolymer may have a weight average molecular weight of 30,000 to 200,000 g/mol and a glass transition temperature of 110 to 180° C. or 130 to 160° C. Any N-phenylmaleimide-based copolymer satisfying the above ranges and conditions may be largely used without limitation, and may be a commercially available product.

The alicyclic epoxy compound included in the composition for reaction extrusion may be one or more selected from the group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis(3,4-epoxy methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, 1,2,8,9-diepoxylimonene, and the like.

An acid compound included in the composition for reaction extrusion may be any one or a combination of two or more selected from the group consisting of $R_1COOH$, $R_2SO_3H$, and salt compounds thereof wherein $R_1$ and $R_2$ are independently $C_{6-30}$ alkyl, $C_{6-30}$ aryl, or $C_{6-30}$ ar$C_{6-30}$ alkyl, and the salt compound of the acid compound may be represented by $R_1COOM$ and $R_2SO_3M$ wherein $R_1$ and $R_2$ are as described above, and M is a cation. M may be an alkali metal cation or ammonium cation, and as a non-limiting example, M may be one or more selected from the group consisting of a sodium ion, a potassium ion, a lithium ion, and the like, but is not limited thereto. In some embodiments, the acid compound may be $R_2SO_3H$, and $R_2$ may be $C_{6-12}$ ar$C_{6-18}$ alkyl, and as an example, may be selected from butylbenzenesulfonic acid, octylbenzenesulfonic acid, dodecylbenzenesulfonic acid, pentadecylbenzenesulfonic acid, and the like, but is not limited thereto.

According to an exemplary embodiment of the present disclosure, the composition for reaction extrusion may include 5 to 40 wt % of the polystyrene, 40 to 90 wt % of the styrene-acrylonitrile copolymer, 1 to 35 wt % of the N-phenylmaleimide-based copolymer, 1 to 6 wt % of the alicyclic epoxy compound, and 0.01 to 1.5 wt % of the acid compound. Specifically, the composition for reaction extrusion may include 10 to 20 wt % of the polystyrene, 60 to 80 wt % of the styrene-acrylonitrile copolymer, 5 to 20 wt % of the N-phenylmaleimide-based copolymer, 1 to 6 wt % of the alicyclic epoxy compound, and 0.01 to 1.5 wt % of the acid compound. When the ranges are satisfied, a matting agent which exerts an excellent matting effect without deterioration of mechanical properties may be prepared, and when it is added to the matting polymer composition and processed, a molded article having a high-quality surface appearance may be manufactured.

According to another exemplary embodiment of the present disclosure, the matting agent may be a matting agent prepared from a composition for reaction extrusion including polycarbonate, a styrene-acrylonitrile, an alicyclic epoxy compound, and an acid compound.

Polycarbonate (PC) included in the composition for reaction extrusion may have a weight average molecular weight of 15,000 to 60,000 g/mol and a glass transition temperature of 130 to 170° C. or 140 to 160° C., but is not limited thereto, and any polycarbonate satisfying the range may be used without limitation. In addition, a commercially available product may be used.

The styrene-acrylonitrile, the alicyclic epoxy compound, and the acid compound included in the composition for reaction extrusion are as described above.

The composition for reaction extrusion including polycarbonate, styrene-acrylonitrile, an alicyclic epoxy compound, and an acid compound may include 10 to 40 wt % of the polycarbonate, 55 to 85 wt % of the styrene-acrylonitrile copolymer, 1 to 6 wt % of the alicyclic epoxy compound, and 0.01 to 1.65 wt % of the acid compound. Specifically, the composition may include 15 to 35 wt % of the polycarbonate, 60 to 80 wt % of the styrene-acrylonitrile copolymer, 1 to 6 wt % of the alicyclic epoxy compound, and 0.01 to 1.65 wt % of the acid compound. When the ranges are satisfied, a matting agent which exerts an excellent matting effect without deterioration of mechanical properties may be prepared, and when it is added to the matting polymer composition and processed, a molded article having a high-quality surface appearance may be manufactured.

The matting agent content may be 1 to 40 parts by weight, or 1 to 30 parts by weight, or 2 to 24 parts by weight, or 2 to 20 parts by weight, based on 100 parts by weight of ASA. When the range is satisfied, an excellent matting effect may be shown without deterioration of mechanical properties.

In addition, the matting agent prepared from the composition for reaction extrusion may effectively decrease gloss without deterioration of the physical properties of the existing base polymer only with a small amount of addition, has excellent dispersibility with the base polymer, and has a dense crosslinking degree, and thus, may have further improved thermal resistance and allows a high-quality surface appearance.

According to an exemplary embodiment of the present disclosure, the matting polymer composition may further include an additive commonly used in the art, depending on the purpose and the use. For example, the composition may further include a UV stabilizer, a UV absorber, an antioxidant, a viscosity adjusting agent, a plasticizer, a thermal stabilizer, a dye, a pigment, a coloring agent, a release agent, an antistatic agent, an antimicrobial agent, a processing aid, a metal deactivator, a flame retardant, an anti-fraction agent, a wear resisting agent, a lubricant, and the like. Here, the additives may be included at an appropriate content within the range which does not impair the physical properties to be desired in the present disclosure.

The UV stabilizer may be used without limitation as long as it is commonly used or known, and for example, may be a HALS-based UV stabilizer, and the like, and a non-limiting example of the HALS-based UV stabilizer may include one or two or more selected from the group consisting of 1,1-bis(2,2,6,6-tetramethyl-4-piperidyl) succinate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-N-butyl-3,5-di-tert-butyl-4-hydroxybenzylmalonate, a condensation product of 1-(2-hydroxyethyl)-2,2,6,6-tetramethyl-4-hydroxypiperidine and succinic acid, a linear or cyclic condensation product of N,N'-bis(2,2,6,6-tetramethyl-4-piperidyl)hexamethylene diamine and 4-tert-octylamino-2,6-di-chloro-1,3,5-triazine, tris(2,2,6,6-tetramethyl-4-piperidyl)nitrilotriacetate, tetrakis(2,2,6,6-tetramethyl-4-piperidyl)-1,2,3,4-butane tetracarboxylate, and the like, but is not limited thereto, and a commercially available product may be used.

The UV absorber may be used without limitation as long as it is commonly used or known, and for example, may be hydroxybenzotriazole, and specifically, may be one or two or more selected from the group consisting of 2-(2'-hydroxyphenyl)benzotriazole, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl) chlorobenzotriazole, 2-(3 '-tert-butyl-2'-hydroxy-5'-methylphenyl-5-chlorobenzotriazole, and the like, but is not limited thereto, but is not limited thereto, and may be a commercially available product.

The UV stabilizer and the UV absorber may be used independently of each other, or may be used in combination. The content of the UV stabilizer may be 0.01 to 5.0 parts by weight or 0.1 to 3.0 parts by weight, and the UV absorber may be included at 0.01 to 5.0 parts by weight or 0.1 to 3.0 parts by weight, based on 100 parts by weight of ASA. When the UV stabilizer and the UV absorber are used in combination, the content may be 0.01 to 10 parts by weight, or 0.1 to 5 parts by weight based on 100 parts by weight of ASA. When the range is satisfied, weather resistance may be further improved without impairment of impact strength and flowability. In addition, a weight ratio between the UV stabilizer and UV absorber may satisfy 1 to 9:9 to 1, but is not limited thereto as long as the physical properties to be desired in the present disclosure are not impaired.

The present disclosure may provide a molded article manufactured by processing the matting polymer composition described above. The molded article has excellent impact strength and weather resistance, has uniformly formed roughness on the surface to have excellent matting properties, and may have a high-quality surface appearance by effectively preventing defects such as pin holes, dielines, and cracks. A processing method of the molded article is not limited as long as it is a commonly used or known method, and for example, methods such as casting, extrusion, injection, a blow molding may be used, and for instance, an extrusion or injection processing method may be used.

Conventionally, when a polymer composition including a matting agent is manufactured into a molded article by extrusion molding, defects such as pin holes, dielines, and cracks often occur on the surface of the molded article and matting performance was insufficient. However, since the matting polymer composition according to an embodiment includes a matting agent prepared from an acrylate-styrene-acrylonitrile graft copolymer, two kinds of styrene-acrylonitrile copolymers having different acrylonitrile contents from each other, and a composition for reaction extrusion, the molded article manufactured from the composition may implement excellent matting performance and significantly decreased surface defect characteristics.

The present disclosure may provide a sheet including a base layer, and a skin layer laminated by co-extruding the matting polymer composition described above on the base layer. In the co-extrusion method, co-extrusion may be performed by using a co-extruder which is maintained at a temperature equivalent to or higher than the melting point of a base layer polymer composition and a skin layer polymer composition to melt and laminate each component, thereby manufacturing a multilayer sheet, but is not limited thereto, and the sheet may be manufactured by a known or common manufacturing method. In addition, the sheet may be a multilayer sheet in which one or two or more films or adhesive layers are further laminated between the base layer and the skin layer, but is not limited thereto as long as the physical properties to be desired in the present disclosure are not impaired.

According to an exemplary embodiment of the present disclosure, the base layer may be one or a mixture thereof selected from the group consisting of polyvinyl chloride (PVC), polypropylene (PP), polyacrylate, polyethylene terephthalate (PET), polybutylene terephthalate (PBT), polymethylmethacrylate (PMMA), polycarbonate (PC), polyamide, styrene-acrylonitrile copolymer (SAN), acrylonitrile-butadiene-styrene (ABS), acrylonitrile-styrene-acrylate (ASA), and the like, but is not limited thereto as long as the physical properties to be desired in the present disclosure are not impaired.

The sheet may have a thickness of 1 to 500 μm, but may be processed by adjusting the thickness depending on the field to be applied, and the thickness of the skin layer may be 0.01 to 25%, 0.1 to 20%, or 1 to 15% of the entire sheet thickness, but is not limited thereto.

In addition, the co-extrusion refers to a method of manufacturing a multilayer structure by adding one or more layers in manufacturing an extrusion coating, a film, or a sheet using two or more extruders, and for example, a method of joining a base layer and a skin layer extruded from two or more T-die extruders in a roll may be applied, but is not limited thereto, and as the extruder, one extruder selected from a common single screw extruder, single screw and twin screw extruders having a separate kneading section, and the like may be used.

In addition, by the co-extrusion process as described above, a flat multilayer sheet may be manufactured and a molded article having a curved design with a special profile shape and the like may be manufactured, but the extrusion method or the shape of the molded article is not largely limited as long as the base layer polymer composition and the matting polymer composition described above are processed by melting to manufacture a product.

Hereinafter, the present disclosure will be described in more detail based on the examples and the comparative examples. However, the following examples and comparative examples are only an example for describing the present disclosure in more detail, and do not limit the present disclosure in any way.

Method of Measuring Physical Properties

1) Surface gloss: measured at 20°, 60°, and 85° in accordance with ASTM D523
2) Surface appearance: the surface of an extruded sheet was observed with the naked eye and a surface roughness, roughness uniformity, and occurrence of pin holes were evaluated as excellent (◎), good (○), average (Δ), and bad (×) according to the following conditions.

Excellent: surface roughness was uniform and no pin hole existed.

Good: surface roughness was uniform and the number of pin holes per unit area (100 mm×100 mm) was less than 5.

Average: surface roughness was not uniform and the number of pin holes per unit area (100 mm×100 mm) was 5 or more and less than 10.

Bad: surface roughness was not uniform and the number of pin holes per unit area (100 mm×100 mm) was 10 or more.

3) IZOD impact strength (Noched IZOD impact strength): measured at ¼" and ⅛" in accordance with ASTM D256.

4) Heat softening temperature (Vicat softening temperature, VST): measured in accordance with ISO R306 B50 (50 N, 50° C./HR).
5) Weather resistance: measured in accordance with SAE J1960. Specifically, a specimen was irradiated with a light source having an intensity of 4000 KJ for 2000 hours and then dE/db was measured.

Preparation Example 1: Preparation of Matting Agent for Reaction Extrusion

A polymer composition formed of 17.5 wt % of polystyrene (Kumho, GP-125), 70 wt % of a styrene-acrylonitrile copolymer (LG Chem, 92HR), and 12.5 wt % of a N-phenylmaleimide-based copolymer (DENKA IP) was added to a twin screw extruder. Subsequently, 3.5 parts by weight of 3,4-epoxycyclohexylmethyl-3,4-epoxycyclohexyl carboxylate and 0.1 parts by weight of dodecylbenzenesulfonic acid based on 100 parts by weight of the polymer composition were added thereto, and melt extrusion was performed at a temperature of 265° C. to obtain a matting agent for reaction extrusion including about 65 wt % of gel.

Preparation Example 2: Preparation of Matting Agent for Reaction Extrusion

A polymer composition formed of 25 wt % of polycarbonate (Lotte Chemical, SC-1220R) and styrene-acrylonitrile copolymer (LG Chem, 92 HR) was added to a twin screw extruder. Subsequently, 2 parts by weight of 3,4-epoxycyclohexylmethyl-3,4-epoxycyclohexyl carboxylate and 0.15 parts by weight of dodecylbenzenesulfonic acid based on 100 parts by weight of the polymer composition were added thereto, and melt extrusion was performed at a temperature of 270° C. to obtain a matting agent for reaction extrusion including about 58 wt % of gel.

Examples 1 to 10 and Comparative Examples 1 to 3: Manufacture of Injection Molded Article and Extruded Sheet 1 part by weight of a benzotriazole-based UV stabilizer (Tinuvin P) and 1 part by weight of a HALS-based UV stabilizer (Sanol LS-770) based on 100 parts by weight of ASA, and 3 parts by weight of $TiO_2$ and 0.3 parts by weight of a phenol-based antioxidant based on a total of 100 parts by weight of ASA and SAN were added with the matting polymer composition formed according to the following Table 1, mixing was performed, a matting polymer composition pellet was obtained by a twin screw extruder, and the pellet was dried to manufacture a injection molded article specimen with 100 mm×100 mm×3.0 mm in width, length, and thickness by an injection machine and an extruded sheet in a sheet form with 50 mm×500 mm×2.0 mm in width, length, and thickness by a single sheet extruder. The physical properties of the injection molded article and the extruded sheet manufactured were measured, and are shown in the following Table 2.

TABLE 1

| | | SAN | | | | Matting agent | |
|---|---|---|---|---|---|---|---|
| (Part by weight) | ASA | SAN-1 | SAN-2 | α-SAN-2 | SAN-3 | Type | part by weight |
| Example 1 | 100 | 80 | 20 | | | Preparation Example 1 | 8 |
| Example 2 | 100 | 65 | 35 | | | Preparation Example 1 | 8 |
| Example 3 | 100 | 35 | 65 | | | Preparation Example 1 | 8 |
| Example 4 | 100 | 80 | 20 | | | Preparation Example 1 | 10 |
| Example 5 | 100 | 80 | 20 | | 2 | Preparation Example 1 | 8 |
| Example 6 | 100 | 20 | | 80 | | Preparation Example 1 | 8 |
| Example 7 | 100 | 80 | 20 | | | Preparation Example 2 | 8 |
| Example 8 | 100 | 20 | | 80 | | Preparation Example 2 | 8 |
| Example 9 | 100 | 80 | 20 | | | B-MAT | 8 |
| Example 10 | 100 | 80 | 20 | | | XPHERE-NGR | 8 |
| Comparative Example 1 | 100 | 100 | | | | Preparation Example 1 | 8 |
| Comparative Example 2 | 100 | 100 | | | | B-MAT | 8 |
| Comparative Example 3 | 100 | | 100 | | | B-MAT | 8 |

ASA: Kumho Petrochemical, XC-500A (acrylate content: 60 wt %)

SAN-1: LG Chem, 95HC (Mw: 100,000 g/mol, acrylonitrile content: 32 wt %, glass transition temperature: 106° C.)

SAN-2: LG Chem, 92HR (Mw: 125,000 g/mol, acrylonitrile content: 26 wt %, glass transition temperature: 105° C.)

α-SAN-2: LG Chem, 200UH (Mw: 85,000 g/mol, acrylonitrile content: 29 wt %, glass transition temperature: 124° C.)

SAN-3: Galata Chemical, Blendex 869 (Mw: about 5,000,000 g/mol, acrylonitrile content: 25 wt %, glass transition temperature: 107° C.)

Blendex B-MAT (Galata Chemical): styrene-acrylonitrile copolymer

XPHERE-NGR (Pocera): styrene-acrylonitrile copolymer

TABLE 2

| | Surface gloss [GU] | | | | IZOD impact strength [J/m] | | Weather resistance | | VST | Extruded sheet surface |
|---|---|---|---|---|---|---|---|---|---|---|
| | Injection molded article | | Extruded sheet | | | | | | | |
| | 20° | 60° | 60° | 85° | ¼" | ⅛" | db | dE | (° C.) | appearance |
| Example 1 | 5.5 | 28.2 | 11.8 | 12.8 | 18.3 | 32.5 | −0.7 | 1.3 | 89.6 | ⊚ |
| Example 2 | 5.4 | 27.9 | 8.2 | 12.1 | 18.1 | 30.2 | −0.8 | 1.5 | 90.1 | ⊚ |
| Example 3 | 5.6 | 27.4 | 7.9 | 12.5 | 17.5 | 38.9 | −0.9 | 1.7 | 89.9 | ⊚ |
| Example 4 | 5.1 | 25.1 | 8.2 | 8.2 | 15.3 | 27.1 | −0.8 | 1.4 | 90.3 | ⊚ |
| Example 5 | 5.8 | 27.9 | 7.9 | 7.8 | 16.9 | 30.9 | −0.6 | 1.5 | 90.5 | ⊚ |
| Example 6 | 4.8 | 13.0 | 12.4 | 13.7 | 15.4 | 27.8 | −0.1 | 1.6 | 94.2 | ⊚ |
| Example 7 | 5.5 | 28.1 | 12.1 | 12.5 | 20.1 | 33.5 | −0.6 | 1.4 | 91.3 | ⊚ |
| Example 8 | 4.5 | 12.9 | 11.5 | 12.6 | 16.8 | 27.9 | −0.1 | 1.5 | 94.5 | ⊚ |
| Example 9 | 4.7 | 25.5 | 16.2 | 22.3 | 14.4 | 27.9 | −0.8 | 1.3 | 89.1 | ○ |
| Example 10 | 5.9 | 29.4 | 25.1 | 38.5 | 18.0 | 28.6 | −0.5 | 1.8 | 88.9 | Δ |
| Comparative Example 1 | 6.1 | 35.9 | 23.2 | 22.4 | 10.7 | 17.5 | −1.2 | 2.3 | 90.6 | Δ |
| Comparative Example 2 | 7.4 | 73.2 | 53.8 | 58.6 | 8.2 | 15.7 | −1.5 | 2.7 | 89.1 | X |
| Comparative Example 3 | 7.3 | 72.9 | 52.2 | 57.1 | 12.1 | 24.7 | −1.1 | 2.4 | 87.9 | X |

As seen from Table 2, it was confirmed that the sheet (molded article) manufactured by extruding or injecting the matting polymer composition of the present disclosure had an effectively decreased surface gloss, and also, excellent weather resistance and a high-quality surface appearance. In particular, as seen in Examples 1 to 8, when the matting agent prepared from the composition for reaction extrusion described above was used, the gloss in the extruded sheet was effectively decreased, and an extruded sheet which had a uniform roughness on the sheet surface and almost no pin holes, and thus, had a high-quality surface appearance was able to be manufactured.

Specifically, it was confirmed that the matting polymer composition according to the present disclosure had excellent physical properties, from the fact that in Examples 1 to 8, the 85° gloss of the extruded sheet was all 20 or less, or 15 or less, the impact strength (⅛") was all 25 J/m or more, and dE showing weather resistance was 2.0 or less.

In addition, upon comparison of Example 1 with Comparative Examples 1 to 3, when SAN-1 and SAN-2 were included, it was confirmed that a product having both weather resistance and surface appearance effectively improved may be manufactured, and upon comparison of Examples 1 to 3, when 50 to 90 parts by weight of SAN-1 and 15 to 35 parts by weight of SAN-2 were included based on 100 parts by weight of ASA, better thermal resistance and impact resistance were shown.

In addition, it was confirmed that in Example 5, since a small amount of SAN-3 was added, an 85° surface gloss of the extruded sheet was effectively decreased, and in Examples 6 and 8, since SNA-2-2 was included, heating softening temperature was improved.

A matting polymer composition manufactured by extruding and injecting the matting polymer composition according to the present disclosure has mechanical properties such as excellent weather resistance and impact strength, and also, may show an excellent matting effect and a high-quality surface appearance.

A matte multilayer sheet may be manufactured using the matting polymer composition of the present disclosure, and it may be applied to various fields such as those for exterior materials, interiors, and home appliances.

Hereinabove, although the present disclosure has been described by specific matters, exemplary embodiments, and drawings, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to the above-described exemplary embodiments, and the following claims as well as all modified equally or equivalently to the claims are intended to fall within the scope and spirit of the disclosure.

The invention claimed is:

1. A matting polymer composition comprising:

(A) acrylate-styrene-acrylonitrile graft copolymer;

(B-1) first styrene-acrylonitrile copolymer;

(B-2) second styrene-acrylonitrile copolymer; and (C) a matting agent;

wherein the first styrene-acrylonitrile copolymer and the second styrene-acrylonitrile copolymer have different acrylonitrile contents from each other; and wherein the matting agent is prepared from a composition for reaction extrusion including polystyrene (PS), a styrene-acrylonitrile copolymer (SAN), a N-phenylmaleimide-based copolymer (PMI), an alicyclic epoxy compound, and an acid compound.

2. The matting polymer composition of claim 1, wherein the first styrene-acrylonitrile copolymer has an acrylonitrile content of 31 to 40 wt %, and the second styrene-acrylonitrile copolymer has an acrylonitrile content of 22 to 30 wt %.

3. The matting polymer composition of claim 1, wherein the alicyclic epoxy compound is selected from one or more compounds of a group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis(3,4-epoxy-6-methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, and 1,2,8,9-diepoxylimonene.

4. The matting polymer composition of claim 1, wherein the acid compound is any one or a combination of two or more compounds selected from a group consisting of $R_1COOH$ or $R_2SO_3H$, and salt compounds thereof, wherein $R_1$ and $R_2$ are independently $C_{6-30}$ alkyl, $C_{6-30}$ aryl, or $C_{6-30}$ ar$C_{6-30}$ alkyl.

5. The matting polymer composition of claim 1, wherein the composition for reaction extrusion includes 10 to 20 wt % of the polystyrene, 60 to 80 wt % of the styrene-acrylonitrile copolymer, 5 to 20 wt % of the N-phenylmaleimide-based copolymer, 1 to 6 wt % of the alicyclic epoxy compound, and 0.01 to 1.5 wt % of the acid compound.

6. The matting polymer composition of claim 1, wherein the matting polymer composition includes 50 to 90 parts by weight of the first styrene-acrylonitrile copolymer, 15 to 35 parts by weight of the second styrene-acrylonitrile copolymer, and 2 to 24 parts by weight of the matting agent, based on 100 parts by weight of the acrylate-styrene-acrylonitrile graft copolymer.

7. The matting polymer composition of claim 6, wherein a weight ratio between the first styrene-acrylonitrile copolymer and the second styrene-acrylonitrile copolymer is 1:0.1 to 0.5.

8. The matting polymer composition of claim 1, wherein the second styrene-acrylonitrile copolymer has a glass transition temperature of 110 to 130° C.

9. The matting polymer composition of claim 8, wherein the matting polymer composition includes 5 to 50 parts by weight of the first styrene-acrylonitrile copolymer, 30 to 100 parts by weight of the second styrene-acrylonitrile copolymer, and 2 to 24 parts by weight of the matting agent, based on 100 parts by weight of the acrylate-styrene-acrylonitrile graft copolymer.

10. The matting polymer composition of claim 1, further comprising: a third styrene-acrylonitrile copolymer having a weight average molecular weight of 4,000,000 g/mol or more.

11. The matting polymer composition of claim 10, wherein 1 to 6 parts by weight of the third styrene-acrylonitrile copolymer is included based on 100 parts by weight of the acrylate-styrene-acrylonitrile graft copolymer.

12. A molded article manufactured by extruding or injecting the matting polymer composition of claim 1.

13. A sheet comprising: a base layer, and a skin layer formed by co-extruding and laminating the matting polymer composition of claim 1 on the base layer.

14. The sheet of claim 13, wherein the base layer is selected from one or more compounds of a group consisting of polyvinyl chloride (PVC), polypropylene (PP), polyacrylate, polyethylene terephthalate (PET), polybutylene terephthalate (PBT), polymethylmethacrylate (PMMA), polycarbonate (PC), polyamide, styrene-acrylonitrile copolymer (SAN), acrylonitrile-butadiene-styrene (ABS), acrylonitrile-styrene-acrylate (ASA), and a mixture thereof.

* * * * *